United States Patent [19]

Becht et al.

[11] 4,364,887
[45] Dec. 21, 1982

[54] METHOD OF MOLDING MULTI-PLY REINFORCED PANELS AND/OR BELTS

[75] Inventors: Cletus A. Becht, Akron; Ramamoorthy M. Krishnan, Stow; James M. Hogan, Tallmadge, all of Ohio

[73] Assignee: The Goodyear Tire & Rubber Company, Akron, Ohio

[21] Appl. No.: 295,399

[22] Filed: Aug. 24, 1981

[51] Int. Cl.³ .......................... B29H 3/08; B29H 7/22
[52] U.S. Cl. ..................................... 264/171; 156/137; 156/140; 264/213; 264/231; 264/255; 264/258; 264/271.1; 264/279; 264/313; 264/328.2
[58] Field of Search ................ 156/137, 140; 264/213, 264/231, 250, 255, 257, 258, 259, 328.2, 251, 254, 453, 46.4, 46.7, 271.1, 279, 313, 171; 474/261, 262, 264, 266, 267, 268, 271; 428/246, 247, 248, 249, 250, 284, 286

[56] References Cited

U.S. PATENT DOCUMENTS

| | | | |
|---|---|---|---|
| 2,630,603 | 3/1953 | Freedlander et al. | 474/271 |
| 3,042,564 | 7/1962 | Hankins | 264/257 |
| 3,200,180 | 8/1965 | Russ et al. | 264/279.1 |
| 3,441,641 | 4/1969 | Roberts | 264/257 |
| 3,673,023 | 6/1972 | Ross | 474/271 |
| 3,673,883 | 7/1972 | Adams | 474/264 |
| 3,860,684 | 1/1975 | Vance | 474/264 |
| 4,078,032 | 3/1978 | Wenner | 264/251 |

FOREIGN PATENT DOCUMENTS 52-68266  6/1977  Japan .................................. 264/213

*Primary Examiner*—Willard E. Hoag
*Attorney, Agent, or Firm*—J. D. Wolfe

[57] ABSTRACT

A multi-ply elastomeric belt is produced by tensioning fabric over a lower mold section, elastomeric enveloping said fabric under pressure to form a so called "pulley ply" section, inverting said ply, tensioning at least one fabric member over said ply and elastomerizing the fabric to form at least a belt section, a continuous belt can be made.

5 Claims, 4 Drawing Figures

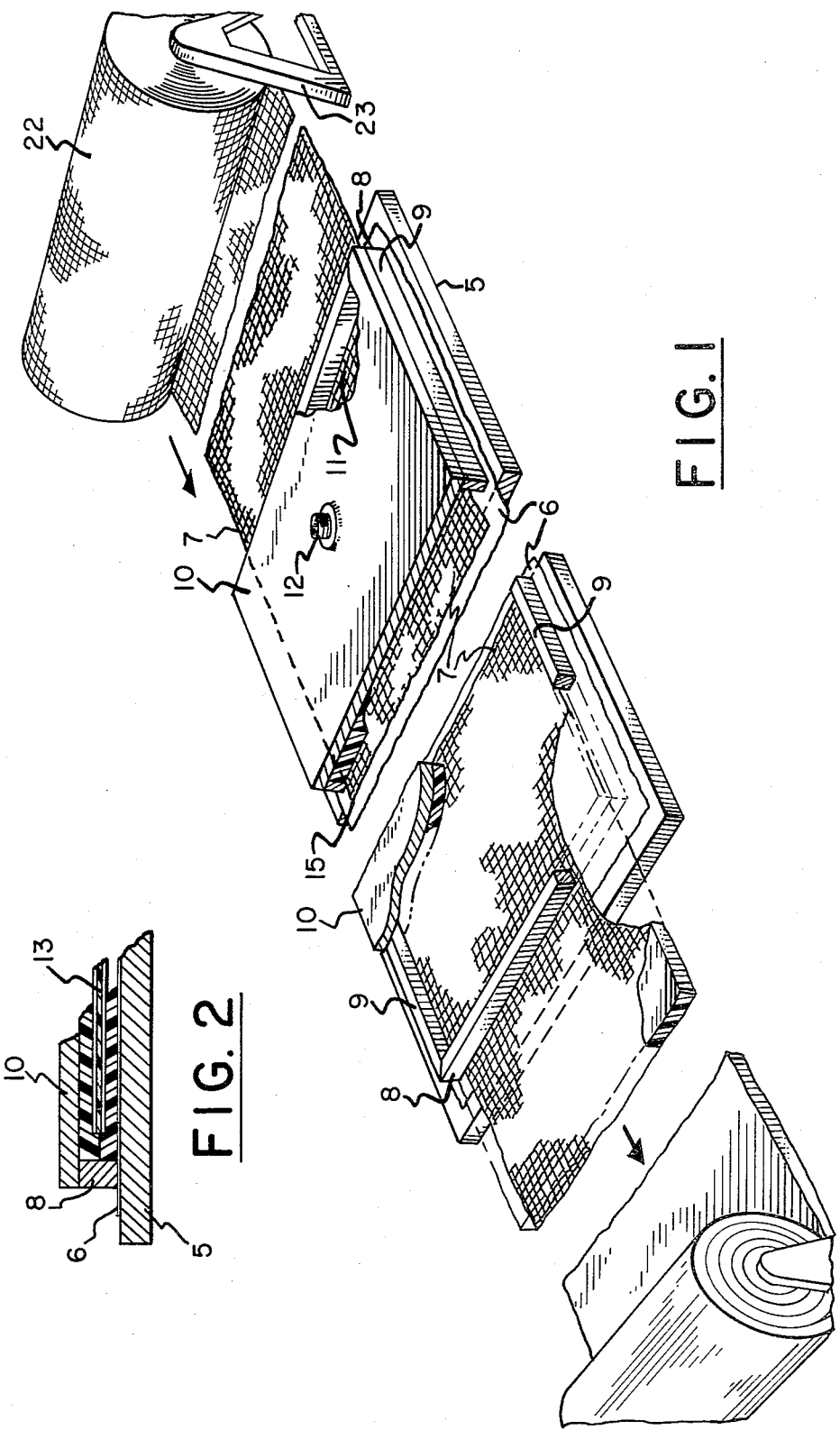

METHOD OF MOLDING MULTI-PLY REINFORCED PANELS AND/OR BELTS

TECHNICAL FIELD

This invention relates to a method of producing an elastomeric covered fabric reinforced belt. More particularly this invention relates to a method of making a multi-ply polyurethane belt wherein one of the belt plies serves as the lower part of the mold during shaping of the belt.

BACKGROUND

Multi-plied belts have been made and used widely for a number of years but when liquid elastomeric precursors are utilized to pour or injection mold multi-plied fabric reinforced belts difficulty was experienced with the plies being irregularly placed and spaced. This lack of precise positioning of the plies affects the belt performance.

DISCLOSURE AND PRACTICE OF THE INVENTION

The nature of this invention and its advantages can be more readily appreciated by reference to the drawings wherein FIG. 1 is a partial perspective view of the mold and the first fabric ply;

FIG. 2 is a partial section view when molding a second or additional ply;

Figure 3:
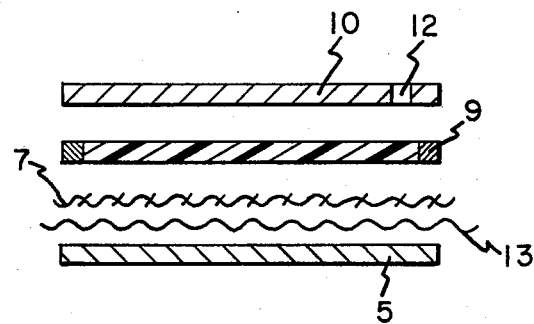
FIG. 3 is an expanded schematic view of the first molding step.

Referring more specifically to FIG. 1, the numeral 5 designates a flat plate, 6 designates a sheet of mold release material such as a sheet of polyethylene or propylene resting of the base plate. The numeral 7 designates a typical belt fabric. Spacers, viz end spacers 8 and side spacers 9 are placed on the base plate 5 to control the amount of elastomer that is applied on top of the fabric 7. With the spacers 8 and 9 resting on the base plate, more precisely on release sheet 6, as best seen in FIG. 1, the cover plate 10 is placed over the spacers to enclose the cavity 11 formed between the base plate, spacers and the cover plate. It should be noted the cover plate has at least one filling opening 12 through which the fluid elastomer precursor is poured or injected to fill the cavity 11. Preferably the cover plate and base plate are locked together by well known locking means such as toggle locks (not shown). Thus cover plate 10, spacers 8 and 9 and inlet 12 cooperate with plate 5 and locking means to yield a cavity member that can be pressurized by filling the cavity with an elastomeric precursor.

With the mold cover 10 and base plate 5 locked in position the elastomeric precursor is fed to the mold through the filling apertures 12 by suitable means such as injecting under pressure or pouring with sufficient head or pressure being developed to force the fluid or liquid precursor through the fabric resting under tension on the release sheet. The aperture may need to be closed with a stopper (not shown) but with many precursors this will not be necessary as precursor after activation has a relatively short open time. As soon as the precursor has set or gelled and preferably cured the mold is opened to give a cured elastomeric covered ply.

Figure 4:
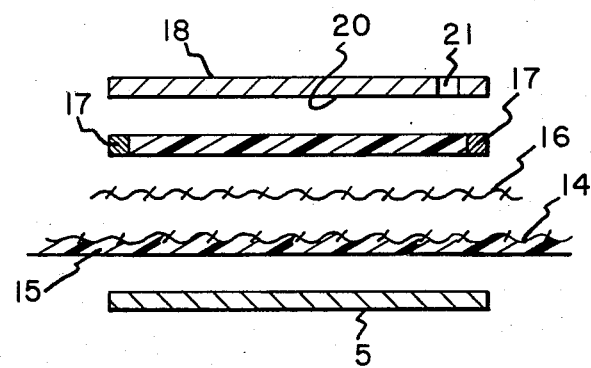
FIG. 4 is an expanded schematic view of the second molding step or finished molded section of the belt.

It should be noted that in a preferred embodiment of this invention the release sheet has a wavy or contoured surface 13 as shown in FIG. 3 to increase the area for bonding the lower ply to the ply juxtapositioned above it in the next molding step (the one best seen in step 2 of FIG. 4).

In step 2 the cured elastomeric belt ply of FIGS. 1 and 3 is placed in the mold of FIG. 4 with the contoured surface 13 in upper position rather than in the downward position shown in FIG. 3. In other words, the first belt ply has been inverted to make the bottom surface of the ply in FIG. 3 the top surface in FIG. 4. Thus the surface 14 of the first ply 15 is the top surface in the molding step of FIG. 3 as the ply 15 has been inverted in FIG. 4.

In the molding step of FIG. 4 the second fabric or reinforcing member 16 is placed over the surface 14 of the first ply and placed under tension by pulling on the ends of the reinforcing member 16. The end shims 17 and side shims 9 (not shown in FIG. 4) are placed on the reinforcing member 16 and the cover plate 18 applied and locked in position to form a mold cavity by means of bottom surface 20 of the cover plate, the four shims and upper surface 14 of the first ply. With the mold parts, i.e. 5 and 10, locked into position the belt is formed by adding the precursor to the mold cavity 19 through aperture 21. When the precursor has cured the mold is opened to permit the section of molded belt to be removed wherein the first ply has not only served as a part of the mold in molding the belt but has been incorporated into the belt as one of its elastomeric plies.

The nature of this invention may be more readily understood by reference to the following representative examples wherein all parts and percentages are by weight unless otherwise indicated.

EXAMPLE 1

The first ply is constructed in a closed, clamped and urethane charged mold of FIGS. 1 and 3. The first step begins by placing a release film on the surface of the bottom half of the mold to preclude release agent contamination and enhance interlaminar bonding of the subsequent layer. A ply of fabric is lightly tensioned over the film and peripheral shims for thickness control are positioned on the fabric. The top half of the mold is then positioned and secured. The mold is charged with the required amount of urethane precursor to constitute the "pulley" stock or first ply. The part is cured and demolded.

In the second or following molding steps the first ply is reversed or inverted on the base plate 5 so that the pulley stock surface is facing down on the bottom half of the mold with the impregnated fabric surface up. A ply of fabric is lightly tensioned over the previously impregnated fabric surface and the peripheral shims are placed, the mold is closed and secured and the required amount of urethane precursor is charged into the mold. The urethane, which is under both machine and reaction pressures, diffuses through the dry, currently applied fabric and bonds to the previously laminated fabric first step comprising the "cover" stock of the belt, and cures to give a finished belt section. Usually a low pressure is desired and ranges from about 1 to 25 pounds per square inch, as higher pressures increase the mold costs.

EXAMPLE 2

In the preceding example a two ply fabric reinforced belt was produced. If additional fabric reinforcing is desired the method of Example 1 can be varied by stretching two fabrics over plate 5 instead of one, then locking the cavity member over the fabrics, injecting the elastomeric precursor, viz a liquid one shot polyurethane reaction mixture, through the inlet port to fill the cavity and forcing the liquid mixture through the fabric members to form the so called "pulley" ply when the precursor is cured.

The so called "pulley" ply is inverted on plate 5 to cause the upper ply surface to rest on the plate. Then one or two fabric sheets are stretched over the so called "pulley" ply resting on the plate. With the sheets under tension the cavity member is locked over the "pulley" ply by closing the usual mold toggle locks before injecting the precursor and curing it to form the belt.

The elastomeric precursors are of two types, those formed by mixing two components essentially at the time of injection or those which are storage stable until subjected to elevated temperatures in excess of 25° C. or higher. The polyurethanes are the preferred elastomeric precursors of this invention. The fabric reinforcing member can be any of the well known belt fabrics such as cotton, rayon, polyester, polyamide, woven wire sheets, glass fibers and mixtures of these.

The preceding examples have described a method of making a belt as a noncontinuous one. Generally belts are desired in relatively long lengths, for instance as conveyor systems which may be as much as a mile in length. In may instances a number of belts are fastened together to give these long conveyor belt systems. Therefore it is desirable to produce belts in relatively long lengths. Relatively long lengths of belts can be produced by modification of the above examples.

EXAMPLE 3

In this modification a roll 22 of the fabric sheet is positioned on the roll support 23 at one end of the molding apparatus and pulled through it to rewind roll 24 resting on support 25.

The desired tension of a fraction to a few pounds per square inch on the fabric is obtained by controlling the tension on rolls 22 and 24 by the usual tensioning means not shown.

The cavity member is locked over the fabric. Then the liquid polyurethane reaction mixture is injected and cured to form a pulley ply. The cavity member is unlocked and the rewind roll is operated, for instance by hand pulling, to advance the pulley ply to expose unelastomerized fabric and to retain it under tension. The cavity member is locked again thereon before injecting the liquid polyurethane reaction mixture and curing it to form another section of the pulley ply. This procedure is repeated until the desired length of pulley ply is obtained.

The pulley ply on the rewind roll is placed on roll support 23 and unrolled over plate 5 to invert the pulley ply on the plate. Then at least one continuous fabric sheet is tensioned over the pulley ply before locking the cavity member, injecting and curing the liquid polyurethane reaction mixture to give a finished belt section.

The cavity member is unlocked again and the finished belt section is advanced so that the next section can be made.

It should be indicated that it is desirable that the joints where the pulley ply section and the joints of the belt sections occur should be adjusted whereby these joints are spced apart and are not juxtaposition.

While certain representative embodiments and details have been shown for the purpose of illustrating the invention it will be apparent to those skilled in this art that various changes and modifications may be made therein without departing from the spirit or scope of the invention.

We claim:

1. A method of making a fabric reinforced belt comprising spreading a release material on a flat surface, placing at least one fabric reinforcing member under tension on the release material, forming a pressurizable cavity over said fabric reinforcing member by locking the cavity member having at least one injection opening and a top and side closure means, filling to pressurize said cavity with an elastomeric precursor to encapsulate the fabric, setting said precursor to form a belt ply, inverting said ply to expose the side in contact with said release material, placing at least one other fabric reinforcing member on the exposed side of said ply, forming said pressurizable cavity over said ply by locking said cavity member, filling to pressurize said cavity over said ply with an elastomeric precursor and curing said precursor to form a multiple ply belt having the plies bonded together.

2. The method of claim 1 wherein the fabric reinforcing members are continuous and the belt ply is advanced to expose an unelastomerized fabric to permit another section of the belt ply to be formed, forming at least one other section of belt ply before inverting the belt ply, placing at least one continuous fabric reinforcing member over the belt ply forming a belt section, advancing said belt section to form at least one other secion of belt to form a continuous belt.

3. The method of claim 1 wherein the elastomeric precursor is a liquid polyurethane reaction mixture.

4. The method of claim 1 wherein the release material is spread as a self supporting film.

5. The method of claim 4 wherein the film has a contoured surface.

* * * * *